(12) United States Patent
Gershon

(10) Patent No.: US 6,826,155 B1
(45) Date of Patent: *Nov. 30, 2004

(54) APPARATUS AND METHOD FOR FACILITATING STANDARDIZED TESTING OF SIGNAL LINES

(75) Inventor: Eugen Gershon, San Jose, CA (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,456

(22) Filed: Jul. 28, 1999

(51) Int. Cl.[7] .............................................. H04L 1/00
(52) U.S. Cl. ...................... 370/244; 370/245; 370/248; 379/14.01; 379/22.03; 379/24; 379/27.06; 379/29.03; 379/29.04; 714/25
(58) Field of Search ................................. 370/241, 242, 370/243, 244, 245, 247, 248, 251, 252; 379/1.01, 1.04, 9, 9.02, 9.06, 12, 14.01, 22.01, 22.03, 24, 27.06, 29.02, 29.03, 29.04, 29.07, 32.01, 32.02, 22; 714/25, 32, 30, 36, 31

(56) References Cited

U.S. PATENT DOCUMENTS

| | | | |
|---|---|---|---|
| 3,912,882 A | | 10/1975 | Beerbaum ................ 179/175.3 |
| 4,090,035 A | * | 5/1978 | Popkin ........................ 370/217 |
| 4,597,073 A | * | 6/1986 | Staples ......................... 370/24 |
| 5,436,968 A | | 7/1995 | Parker, Jr. et al. .......... 379/398 |
| 5,550,894 A | * | 8/1996 | Charland ........................ 379/2 |
| 6,014,425 A | * | 1/2000 | Bingel et al. ................. 379/27 |
| 6,026,145 A | * | 2/2000 | Bauer et al. ................... 379/26 |
| 6,052,380 A | * | 4/2000 | Bell ............................ 370/445 |
| 6,212,258 B1 | * | 4/2001 | Bella et al. .................... 379/29 |
| 6,339,357 B1 | * | 1/2002 | Yamasaki et al. ........... 327/538 |
| 6,430,266 B2 | * | 8/2002 | Gershon ....................... 379/22 |

FOREIGN PATENT DOCUMENTS

| | | | |
|---|---|---|---|
| WO | WO 99/12330 | 3/1999 | .......... H04M/11/06 |
| WO | WO 99/34588 | 7/1999 | .......... H04M/11/00 |

* cited by examiner

*Primary Examiner*—Dang Ton
*Assistant Examiner*—Shick Hom
(74) *Attorney, Agent, or Firm*—Williams, Morgan & Amerson, P.C.

(57) ABSTRACT

The present invention provides for an apparatus and a method for testing and evaluating a transmission line. A set of command and data signals is received through an input/output interface. The command and data signals from the input/output interface are processed for controlling at least one relay. At least one switch is activated for testing a transmission signal line using the relay. The transmission signal line is tested based upon the activated switch.

30 Claims, 9 Drawing Sheets

APPARATUS AND METHOD FOR FACILITATING STANDARDIZED TESTING OF SIGNAL LINES

BACKGROUND OF THE INVENTION

1. Field of the Invention

This invention relates generally to testing and improving signal lines, and, more particularly, to applying tests and corrective measures to transmission lines.

2. Description of the Related Art

The testing and maintenance of signal lines, particularly transmission lines in telephone systems, is has become necessary and costly task. In telephony, it is common practice to transmit signals between a subscriber station and a central switching office via a two-wire bi-directional communication channel. The length of the transmission lines that carry telephone signals between the central switching office and the subscriber station can be quite large. As faster signals have been added to carry data over telephone lines, the quality of the transmission line has become critical, creating the need for periodic evaluation and adjustments.

Transmission lines generally have a natural characteristic impedance determined by cable construction and geometry. To drive a signal on a subscriber line while minimizing signal reflection from the far end of the subscriber line and maximizing the signal power entering the line, it is desirable to match the characteristic impedance of the transmission line with a termination at each end.

The Plain Old Telephone Service (POTS), which was designed primarily for voice communication, provides an inadequate data transmission rate for many modern applications. To meet the demand for high-speed communication, designers sought innovative and cost-effective solutions that took advantage of the existing network infrastructure. Several technological advancements were proposed in the telecommunications industry that made use of the existing network of telephone wires. One promising technology is the xDSL technology.

xDSL is making the existing network of telephone lines more robust and versatile. Once considered virtually unusable for broadband communications, an ordinary twisted pair equipped with DSL interfaces can transmit video, television, and high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as a promising and viable option.

There are now at least four popular versions of DSL technology, namely Asymmetrical Digital Subscriber Line (ADSL), Integrated Services Digital Network Digital Subscriber Line (IDSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL technologies and POTS can co-exist in one transmission line (e.g., also referred to as "subscriber line").

Traditional analog voice band interfaces use the same frequency band, 0–4 Kilohertz (KHz), as telephone service, thereby preventing concurrent voice and data use. A DSL interface, on the other hand, operates at frequencies above the voice channels, from 100 KHz to 1.1 Megahertz (MHz). Thus, a single DSL line is capable of offering simultaneous channels for voice and data.

DSL systems use digital signal processing (DSP) to increase throughput and signal quality through common copper telephone wire. It provides a downstream data transfer rate from the DSL Point-of-Presence (POP) to the subscriber location at speeds of up to 1.5 Megabits per second (Mbps). The transfer rate of 1.5 Mbps, for instance, is fifty times faster than a conventional 28.8 kilobits per second (Kbps).

Other tests, such as line continuity tests and load isolation tests, are desirable for properly maintaining transmission lines. However, implementation of these tests can become manual-intensive and increase the costs of transmission line evaluation and maintenance. The industry lacks an efficient and automated method of employing line continuity and load isolation tests, particularly from a remote location. Furthermore, certain interfaces used for telephone transmission applications may cause line inversion problems. To solve line inversion problems, the point of the problem must be isolated and manually corrected, thereby adding to the costs of transmission line maintenance.

Another use of the telephone system is the application of high frequency signals, approximately 7.5 MHz, being placed on the transmission lines to facilitate local network connectivity for multiple electronic products within a subscriber station. When employing high-frequency network applications on the transmission lines, an evaluation of the wiring within a subscriber line is desirable. Currently, the industry lacks an efficient method of checking the integrity of the transmission line for the purpose of local networking.

The present invention is directed to overcoming, or at least reducing the effects of, one or more of the problems set forth above.

SUMMARY OF THE INVENTION

In one aspect of the present invention, an apparatus is provided for testing and evaluating a transmission line. The apparatus provided by the present invention comprises a network interface device capable of implementing one or more tests on said transmission line.

In another aspect of the present invention, a method is provided for testing and evaluating a transmission line. A set of command and data signals is received through an input/output interface. The command and data signals from the input/output interface are processed for controlling at least one relay. At least one switch is activated for testing a transmission signal line using the relay. The transmission signal line is tested based upon the activated switch.

BRIEF DESCRIPTION OF THE DRAWINGS

The invention may be understood by reference to the following description taken in conjunction with the accompanying drawings, in which like reference numerals identify like elements, and in which.

Figure 1:
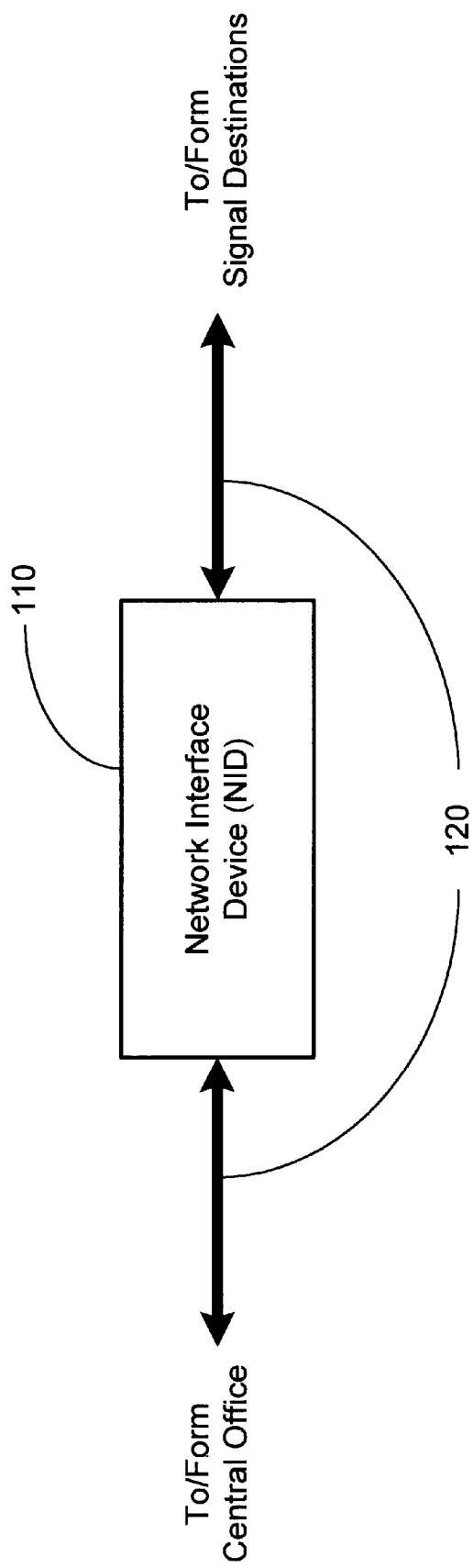
FIG. 1 is an illustration of one embodiment of the apparatus of the present invention, the network interface device.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

To maintain efficient operation of telecommunication infrastructure, periodic testing and calibration of the resources related to the infrastructure should be performed. Testing and calibration of telecommunication infrastructure, such as telephone lines, are also important when employing the telephone lines in innovative and non-traditional operating modes. Current telecommunication infrastructure can be utilized for other technology, such as networking multiple electronic devices within a building. Inspection for the viability of such network usage of telephone lines requires a series of tests described by the disclosure of the present invention. The present invention provides a method and an apparatus for testing the quality and integrity of communication lines, such as telephone lines. The apparatus described in the present invention can be controlled remotely, such as controlling the apparatus from a central location. The apparatus described in the present invention can also be controlled locally, such as from a computer, or it can be controlled by internal programming sequences.

Turning now to FIG. 1, one embodiment of the apparatus of the present invention, a network interface device (NID) 110 is illustrated. The network interface device 110 is placed at any point of interest on a telephone signal line 120. Generally, the location where the network interface device 110 is placed is the point of the telephone signal line 120 that is to be tested. In one embodiment, the telephone signal line 120 is a local loop capable of carrying ADSL and other DSL signals. The network interface device 110 is used to test the telephone signal line 120 using several types of tests. The network interface device 110 is capable of creating a short circuit or an open circuit on the telephone signal line 120. The network interface device 110 is also capable of inverting the wires on the telephone signal line 120. The network interface device 110 can be placed into a mode where a resistance-termination or an active impedance-termination is introduced on the telephone signal line 120. In one embodiment, the network interface device 110 is capable of testing communication lines that are part of a local loop network. The network interface device 110 is also capable of testing a communication line that is part of a computer network, such as a local area network and a home network. In one embodiment, a home network interconnects a plurality of electronic devices with a confined area such as a single-family dwelling.

Figure 2:
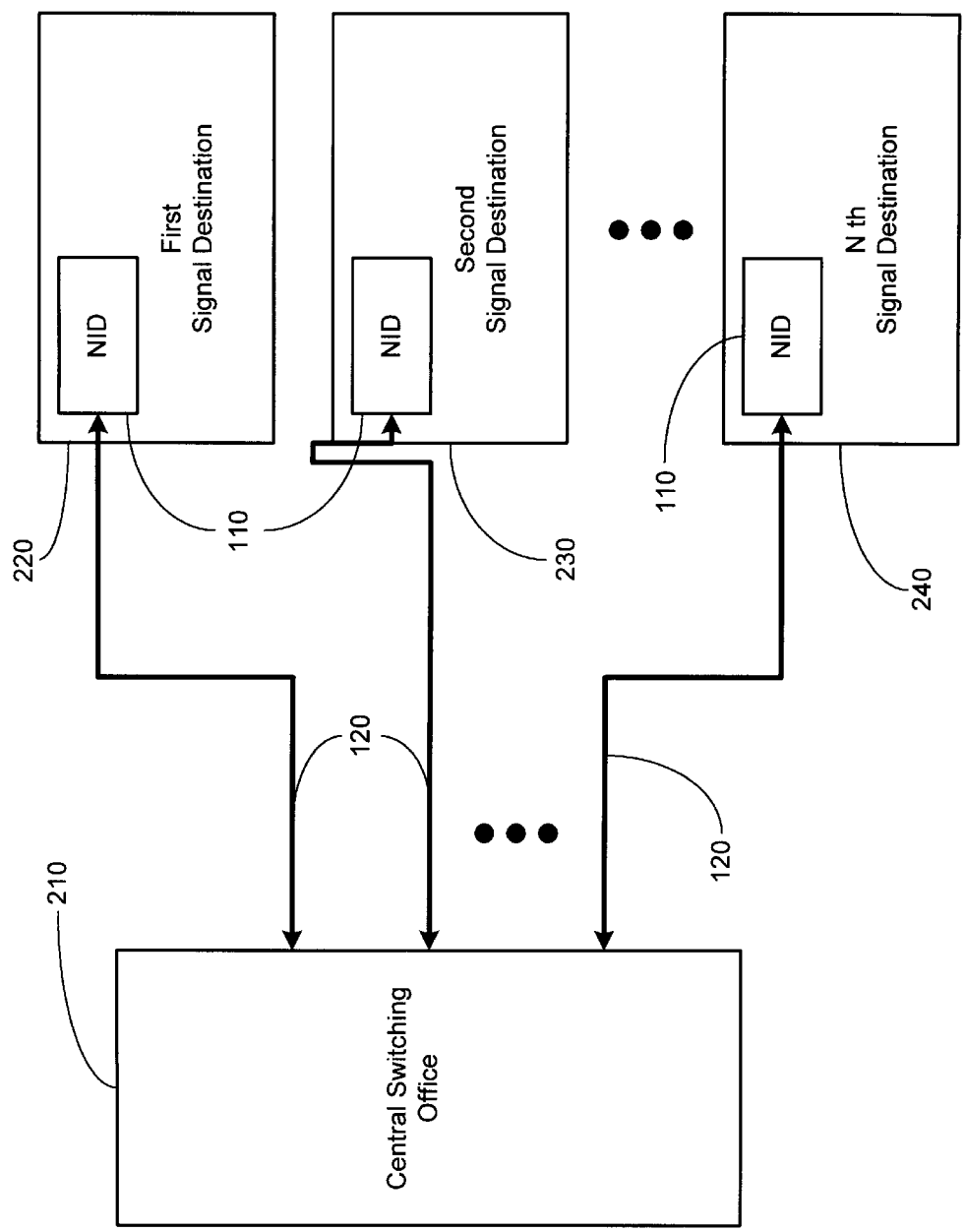
FIG. 2 illustrates one embodiment of an application of the present invention.

Turning now to FIG. 2, one embodiment of an application of the present invention is illustrated. The network interface device 110, which is positioned on the telephone signal line 120, can be placed in a signal destination. As illustrated in FIG. 2, a network interface device 110 is placed in the first through Nth signal destinations 220, 230, 240. In one embodiment, the first signal destination 220 is a subscriber resident unit, such as a single-family dwelling. The network interface device 110 is coupled onto the telephone signal line 120, which carries signals from a central switching office 210 to the signal destinations 220, 230, 240.

In one embodiment, the testing of the telephone signal line 120, using the network interface device 110, can be initiated and controlled from the central switching office 210. Control signals from the central switching office 210 can be sent to the network interface device 110 over the telephone signal line 120. The network interface device 110 can then enter one or more of its multiple test modes and test the telephone signal line 120. The network interface device 110 can also test the telephone wiring (not shown) within the signal destinations 220, 230, 240. The network interface device 110 can also be initiated and controlled locally, within the signal destinations 220, 230, 240.

Figure 3:
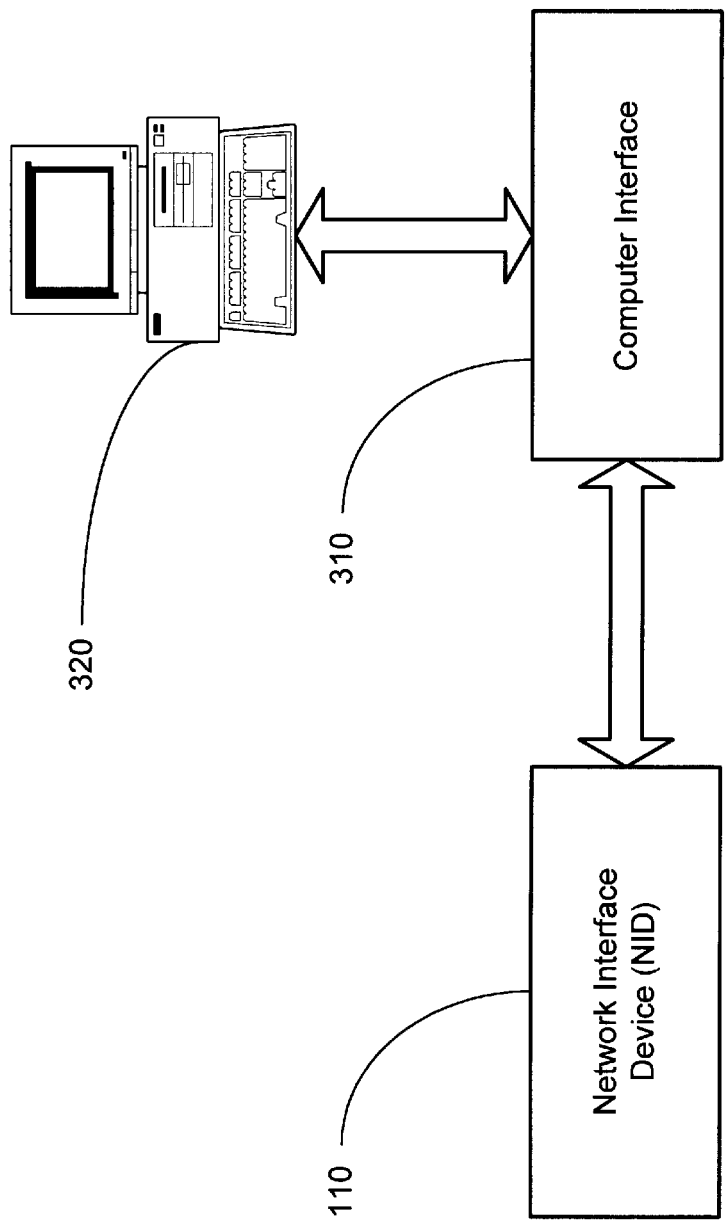
FIG. 3 illustrates one embodiment of a method for controlling the network interface device locally using a computer.

In one embodiment, the network interface device 110 is controlled by a computer, located in the signal destinations 220, 230, 240. Turning now to FIG. 3, one embodiment of a method for controlling the network interface device 110 locally using a computer system 320 is illustrated. The network interface device 110 is coupled to a computer interface 310. In one embodiment, the computer interface 310 is an electronic device that is powered locally. In one embodiment, the computer interface 310 contains a data/command channel from which information is received and transmitted through a modem (not shown). To facilitate communication between the computer system 320 and the network interface device 110, the computer interface 310 sends and receives data to and from the computer system 320. In an alternative embodiment, the computer interface 310 is a printed circuit (PC) board that is connected to a port inside the computer system 320. The network interface device 110 communicates with the computer system 320, and vice versa, through the computer interface 310. In one embodiment, the computer system 320 initiates the network interface device 110 and controls its functions. The computer system 320 may be comprised of a Macintosh system, a UNIX system, a PC system, a VAX system, a Workstation system, or any other system employed by those skilled in the art.

Figure 4:
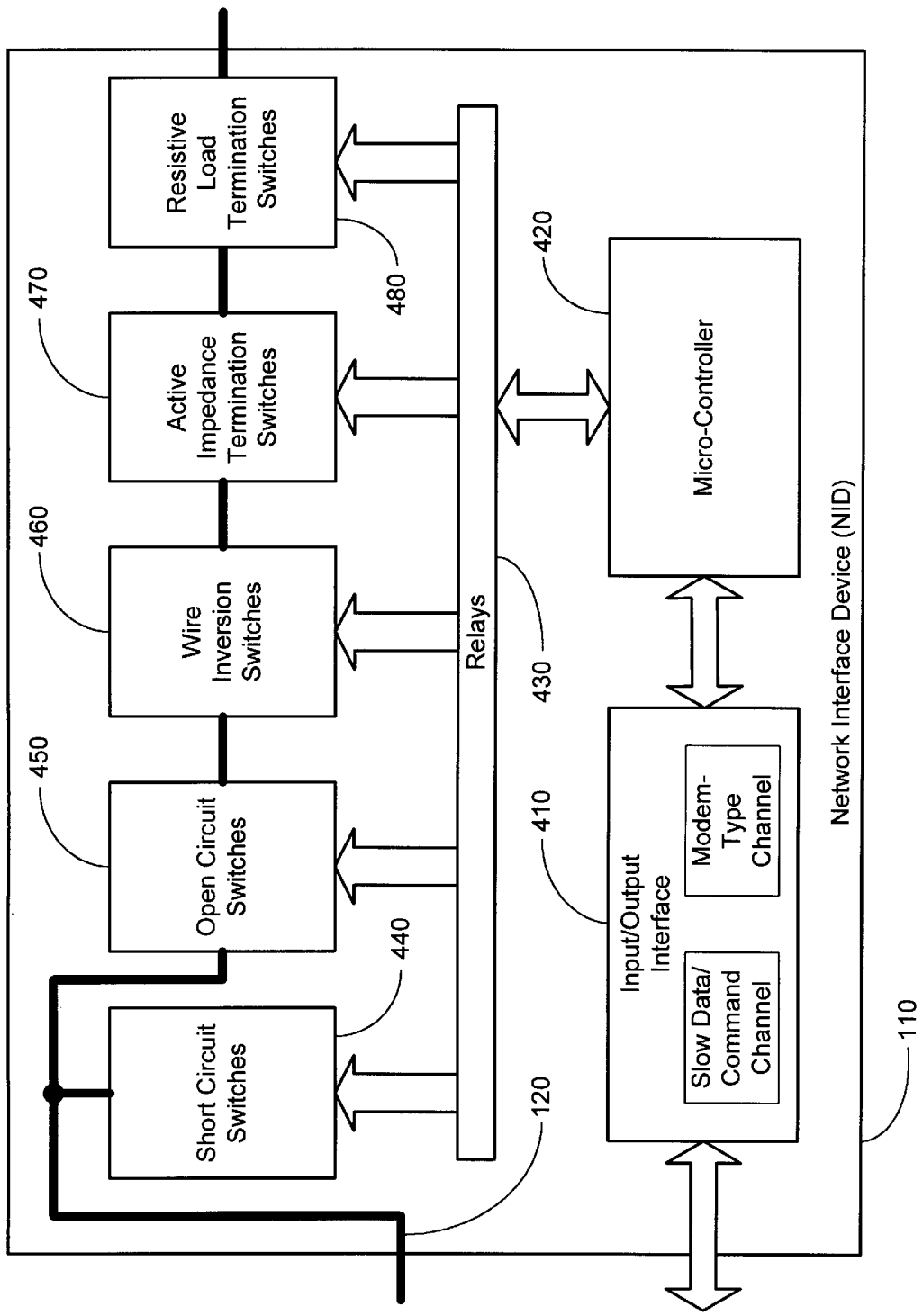
FIG. 4 illustrates a block diagram of the separate functions of the network interface device.

Turning now to FIG. 4, a block diagram of the separate functions of the network interface device 110 is illustrated. The network interface device 110 communicates with the computer interface 310 though an input/output interface 410. The input/output interface 410 is capable of receiving and transmitting data and command signals. In one embodiment, the input/output interface 410 contains a slow data/command channel for receiving command signals, and a modem-type channel for receiving data signals. The input/output interface 410 is capable of sending data to the computer system 320 through the computer interface 30. The input/output interface 410 receives data and command signals from the computer system 320 through the computer interface 310.

The input/output interface 410 presents the data and command signals received from the computer interface 310 to a micro-controller 420. The micro-controller 420 processes the data and control signals received from the input/output interface 410 and directs the operation of the network interface device 110 accordingly. Among its multiple functions, the micro-controller 420 controls the functions of relays 430. In one embodiment, the relays 430 are electro-mechanical devices that are capable of activating and de-activating several types of signal switches.

The network interface device 110 contains multiple sets of signal switches, including short circuit switches 440, open circuit switches 450, wire inversion switches 460, active impedance termination switches 470, and resistive load termination switches 480. Each of the signal switches 440, 450, 460, 470, 480 performs separate independent functions that are controlled by the micro-controller 420, which is in turn controlled by the computer system 320. The micro-controller 420 is capable of detecting the state of each of the signal switches 440, 450, 460, 470, 480 and report back to the computer system 320, or to the central switching office 210. An operator can then test and analyze the behavior of the telephone signal line 120 based upon the states of the relays 430 that control the signal switches 440, 450, 460, 470, 480.

Figure 5:
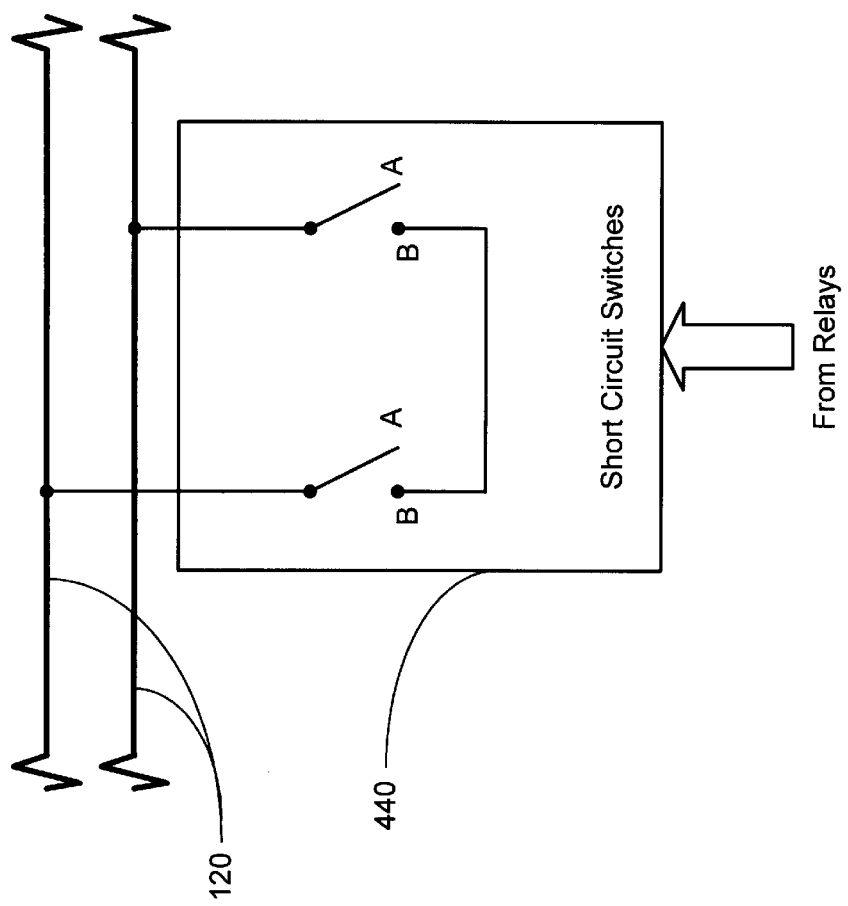
FIG. 5 illustrates short circuit switches described in FIG. 4 in further detail.

The telephone signal line 120 becomes shorted when the short circuit switches 440 are activated by the relays 430. The short circuit switches 440 described in FIG. 4 are illustrated in further detail in FIG. 5. Turning now to FIG. 5, the signal and ground wires from the telephone signal line 120 are tapped and coupled to the short circuit switches 440. Normally, the short circuit switches 440 are held in position "A," where the short circuit switches 440 are in the open position, as shown in FIG. 5. When the short circuit switches 440 are in the open position (position "A"), the telephone signal line 120 operates normally. Upon activation by the relays 430, the short circuit switches 440 are moved to position "B," where the signal and ground wires of the telephone signal lines 120 become shorted together.

In one embodiment, the implementation of the short circuit switches 440 can be used to test the continuity of the telephone signal line 120. In one embodiment, when the short circuit switches 440 are activated and the signal and ground wires in the telephone signal line 120 are shorted, a direct current (DC) is sent through the telephone signal line 120. The path of the DC current can be monitored to determine whether the DC current makes a complete loop. In one embodiment, the DC current is generally in the milliamp range. When a determination is made that the DC current that is applied to the shorted telephone signal line 120 makes a complete loop, a conclusion that there are no significant breaks in the telephone signal line 120 can be made. The central switching office can check several miles of telephone signal line 120 to determine whether there is proper continuity in the telephone signal line 120. In one embodiment, short circuit switches 440 can be used to evaluate the usability of the telephone signal line 120 for networking purposes, by checking for continuity of the telephone signal line 120 within a building.

Figure 6:
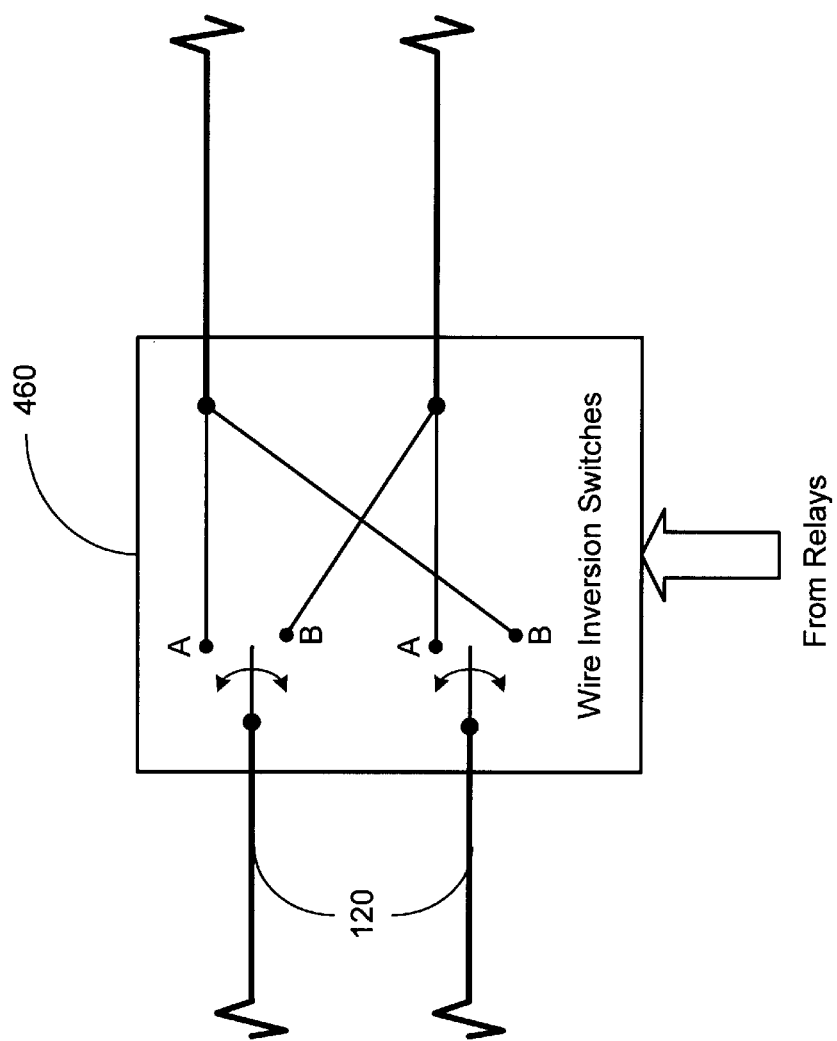
FIG. 6 illustrates open circuit switches described in FIG. 4 in further detail.

Turning back to FIG. 4, to further evaluate the telephone signal line 120, a wire inversion test can be applied to the telephone signal line 120. The signal and ground wires of the telephone signal line 120 can be inverted using the wire inversion switches 460. The wire inversion switches 460 are activated by the relays 430. The wire inversion switches 460 shown in FIG. 4 are illustrated in further detail in FIG. 6. Turning now to FIG. 6, the telephone signal line 120 is tapped and coupled to the wire inversion switches 460. The relays 430 control the position of the wire inversion switches 460. The wire inversion switches 460 can be in one of two positions: position "A" and position "B."

When the wire inversion switches 460 are in position "A," the signal and ground wires in the telephone signal line 120 are connected straight through and function normally. When the wire inversion switches 460 are moved to position "B," the signal and ground wires in the telephone line 120 are inverted, or cross-wired. In other words, when the wire inversion switches 460 are activated to position "B," the signal wire in the telephone signal line 120 becomes connected to the ground wire in the telephone signal line 120, and the ground wire becomes connected to the signal wire.

In one embodiment, the wire inversion switches 460 are used to detect any polarity effects on the telephone signal line 120. Many types of interfaces are connected to the telephone signal line 120, and these interfaces can cause inadvertent cross-wiring problems. Cross-wiring errors in the telephone signal line 120 can cause signal polarity problems. Signal polarity problems can be readily detected when the telephone signal line 120 is inverted by the wire inversion switches 460. For example, if there are signal problems on the telephone signal line 120 due to the connections of an interface, upon inverting the wires in the telephone signal line 120, the signal problems may disappear. Since the network interface device 110 is portable and can be implemented at virtually any point on the telephone signal line 120, a wire inversion error can be narrowed down to a particular location or to a particular interface by repeated testing at different locations.

Figure 7:
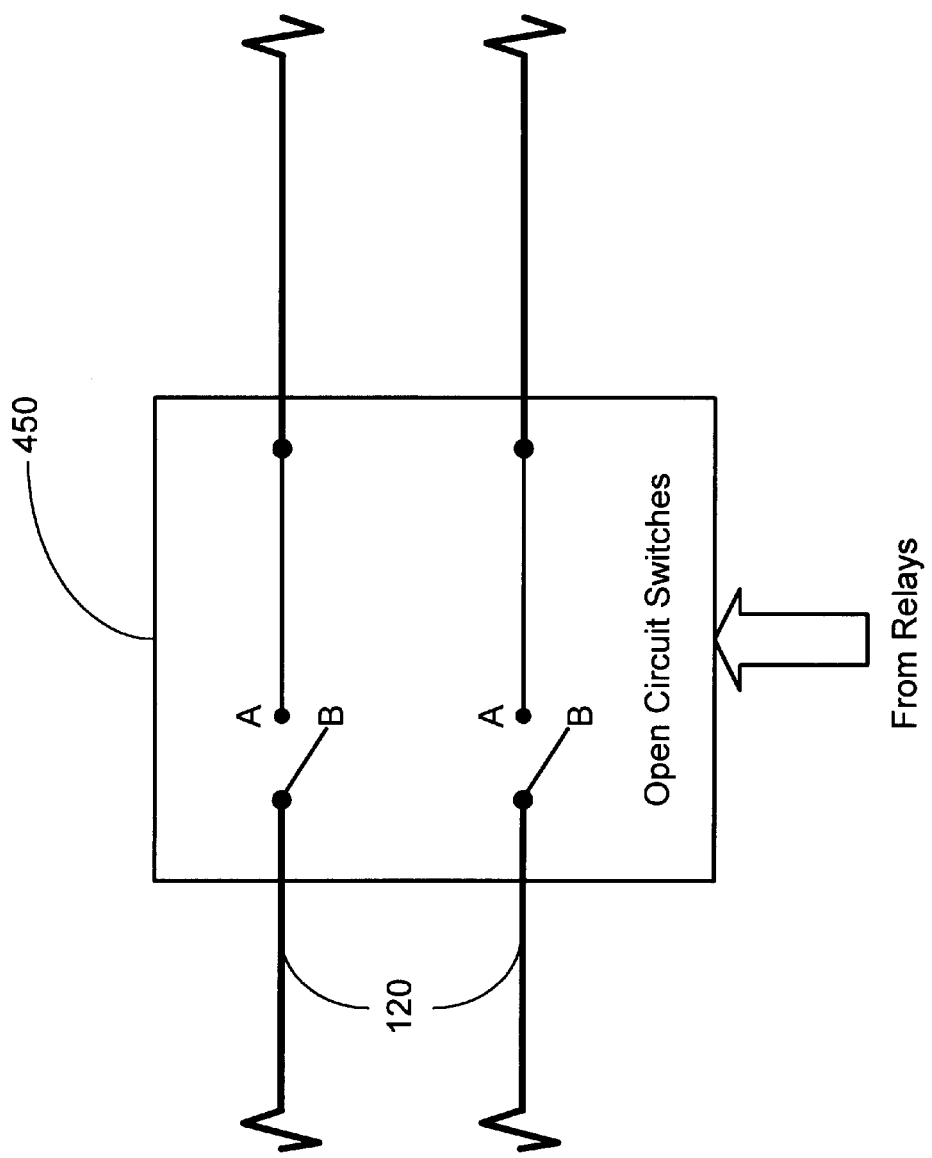
FIG. 7 illustrates line inversion switches described in FIG. 4 in further detail.

Turning back to FIG. 4, to further evaluate the telephone signal line 120, an open circuit test can be applied to the telephone signal line 120. The open line test is implemented when the relays 430 activate the open circuit switches 450. The open circuit switches 450 described in FIG. 4 are illustrated in further detail in FIG. 7. Turning now to FIG. 7, the open circuit switches 450 can be used to create open circuit isolation in the telephone signal line 120. The open circuit switches 450 can be in one of two positions: position "A" and position "B." When the open circuit switches 450 are in position "A," the signal and ground wires in the telephone signal line 120 are connected straight through and function normally. When the open circuit switches 450 are activated to position "B," the signal and the ground wires are disconnected and an open circuit occurs on the telephone signal line 120.

In one embodiment, the open circuit switches 450 are used to evaluate the characteristics of the telephone signal line 120 while certain loads on the telephone signal line 120 are disconnected. For example, the characteristics of the telephone signal line 120 from the central switching office 210 to a signal destination 220, 230, 240 can be examined, without the telephone signal line 120 being connected to any loads. When the open circuit switches 450 are activated to position "B,", all of the loads in a signal destination 220, 230, 240, such as telephones, modems, fax machines, etc., are disconnected from the telephone signal line 120. Line loads, caused by telephones, modems, and other telecommunication devices, change the characteristics of the telephone signal line 120. The open circuit switches 450 allow for measurement of the telephone signal line 120 without the interference of loads.

Furthermore, since the network interface device 110 is portable, the open circuit switches 450 can be implemented at virtually any point on the telephone signal line 120, allowing the central switching office 210 to disconnect any number of signal destinations 220, 230, 240 from the telephone signal line 120. Therefore, using the open circuit switches 450, an operator in the central switching office 210 can examine any portion of the telephone signal line 120 without interference from excessive loads at one or more signal destinations 220, 230, 240.

Figure 8:
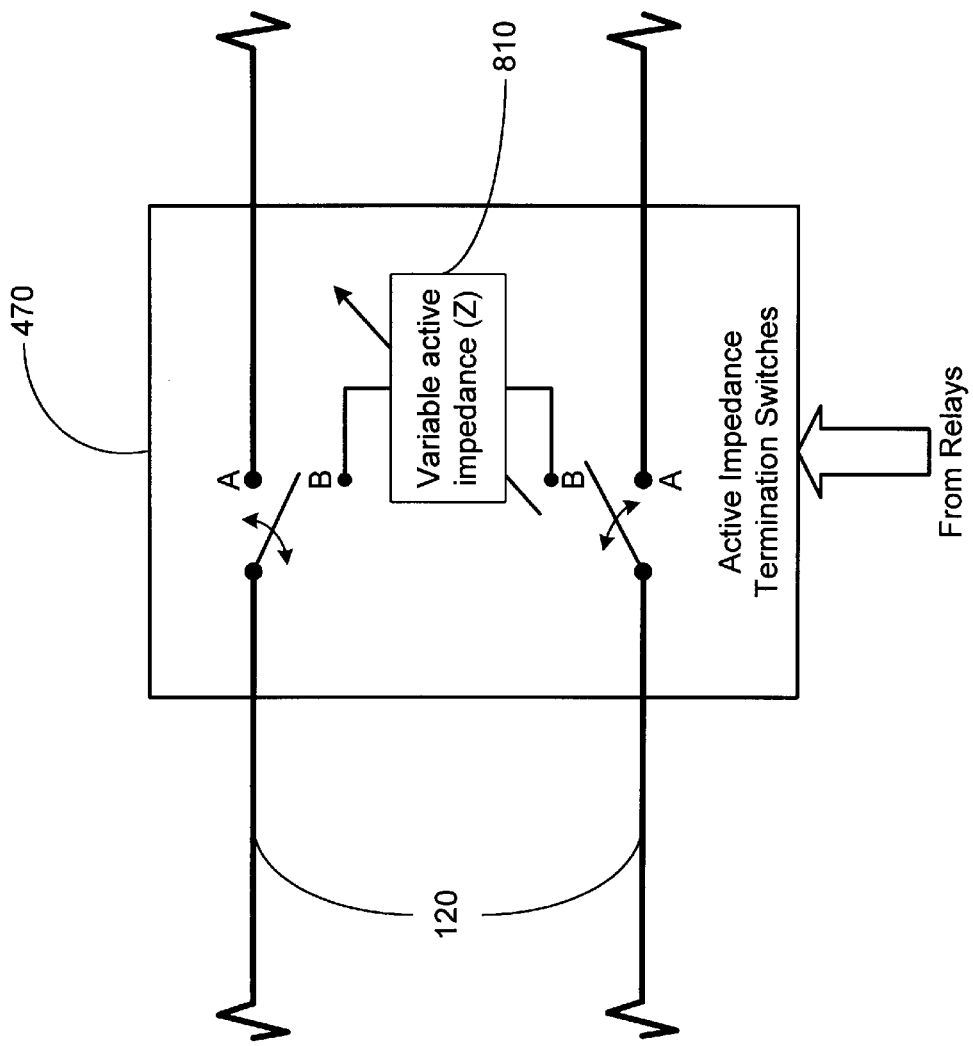
FIG. 8 illustrates the active impedance termination switches described in FIG. 4 in further detail.

Turning back to FIG. 4, to further evaluate and improve the performance of the telephone signal line 120, termination of the telephone signal line 120 is implemented. One such termination is an active impedance termination. The relays 430 can activate the active impedance termination switches 470 to initiate an impedance termination on the telephone signal line 120. The active impedance termination switches 470 described in FIG. 4 are illustrated in further detail in FIG. 8. Turning now to FIG. 8, the active impedance termination switches 470 can be placed in one of two positions: position "A" and position "B." When the active impedance termination switches 470 are activated into position "A," the signal and ground wires in the telephone signal line 120 are connected straight through and function normally. When the active impedance termination switches 470 are activated into position "B," the telephone signal line 120 is terminated with an impedance load 810.

The termination of the telephone signal line 120 is achieved by placing a predetermined impedance between the signal and the ground wires in the telephone signal line 120. In position "B," the active impedance termination switches 470 introduce an active impedance termination on the telephone signal line 120. In one embodiment, an active impedance load 810 is primarily reactive impedance. The active impedance termination on the telephone signal line 120 will allow the central switching office 210 to detect any reactance problems on the telephone signal line 120. Furthermore, in one embodiment, active impedance can be utilized to compensate for reactance problems on the telephone signal line 120. The active impedance termination switches 470 allow for the implementation of impedance matching solutions for reactance problems in the telephone signal line 120. Impedance matching solutions can be readily implemented into the telephone signal line 120 by those skilled in the art who have the benefit of the disclosure of the present invention.

Due to its effects on high frequency signals, active impedance termination may not be desirable when implementing an internal network application of the telephone signal line 120. Internal network applications include using the telephone signal line 120 at high frequencies, such as 7.5 MHz, to network multiple electronic devices within a signal destination 220, 230, 240. An example of an internal network application is networking a computer, a printer, a fax machine, a copier, the air conditioner controls, the refrigerator, and the security alarm system, within a signal destination 220, 230, 240.

In one embodiment, the active impedance termination is utilized to improve telephone voice signals. However, active impedance termination may interfere with high frequency signals used for internal networking. The network interface device 110 can activate the active impedance termination switches 470 to implement the active impedance termination during voice communications by activating the active impedance termination switches 470 to position "B." The network interface device 110 can de-activate the active impedance termination switches 470 to substantially reduce the active impedance termination during internal networking applications by placing the active impedance termination switches 470 to position "A." Therefore, by manipulating the active impedance termination switches 470, the network interface device 110 can be operated as a multi-configuration switch, which allows operation of the telephone signal line 120 as a normal telephone carrier, including as a DSL signal carrier, and as an internal network signal carrier.

Figure 9:
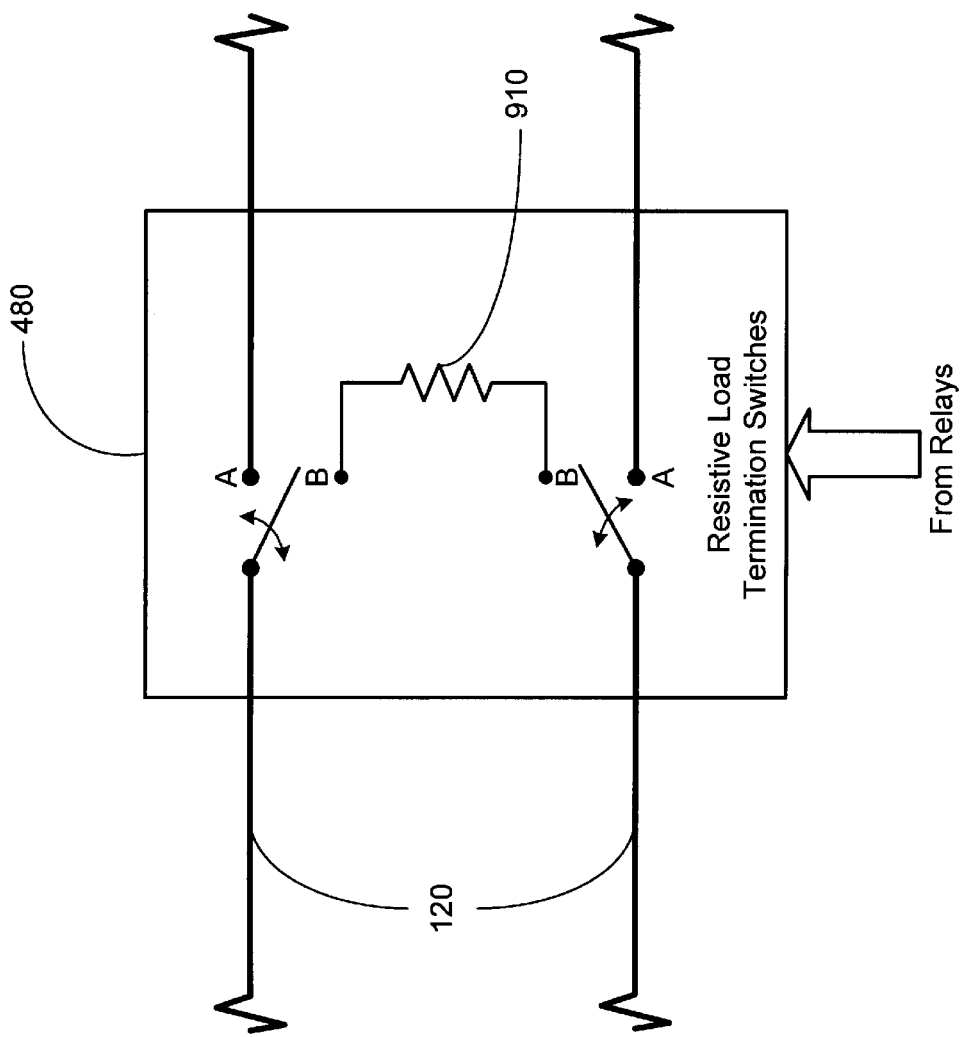
FIG. 9 illustrates resistive load switches described in FIG. 4 in further detail.

Another type of termination applied on the telephone signal line 120 is a resistive load termination. Turning back to FIG. 4, the relays 430 can activate the resistive load termination switches 480 to initiate the resistive load termination on the telephone signal line 120. The resistive load termination switches 480 described in FIG. 4 are illustrated in further detail in FIG. 9. Turning now to FIG. 9, when the resistive load termination switches 480 are activated into position "A," the signal and ground wires in the telephone signal line 120 are connected straight through and function normally. When the termination switches are activated into position "B," a resistive load 910 of a predetermined value is introduced onto the telephone signal line 120. The resistive load 910 terminates the signal and the ground wires of the telephone signal line 120.

In one embodiment, signal transmission problems, such as signal reflections, can be substantially reduced by applying a resistive load termination onto the telephone signal line 120. Since the network interface device 10 is portable, the resistive load termination can be applied at virtually any point in the telephone signal line 120. In one embodiment, to reduce the effects of transmission line signal reflections, impedance matching principles, which are readily known by those skilled in the art, can be implemented by activating the resistive load termination switches 480.

The resistive load termination switches 480 can also be used to test the telephone signal line 120. The central switching office 210 can initiate the activation of the resistive load termination switches 480 at a predetermined point in the telephone signal line 120. The central switching office 210 can then measure the impedance of the telephone signal line 120 and determine whether a fault exists if the measured impedance does not match the predetermined value of the resistive load 910. Furthermore, the value of the resistive load 910 can be varied to extreme values so that the performance limitations of the telephone signal line 120 can be determined. For example, the value of the resistive load 910 can be reduced, approaching a short circuit termination, until the telephone signal line 120 stops functioning. The last resistance value for which the telephone signal line 120 was functioning will be the lower limit of the resistive load termination value. Similarly, the value of the resistive load 910 can be increased, approaching an open circuit, until the telephone signal line 120 stops functioning. The last resistance value for which the telephone signal line 120 was functioning will be the upper limit of the resistive load termination value. The upper and lower limits of the resistive load termination values can be used to determine the maximum and minimum transmission capabilities of the telephone signal line 120.

Turning back to FIG. 4, in one embodiment, the signal switches 440, 450, 460, 470, 480 are arranged in an array within the network interface device 110. All of the signal switches 440, 450, 460, 470, 480 contain a normal mode, where the telephone signal line 120 operates normally, and a test mode, where individual tests from each of the signal switches 440, 450, 460, 470, 480 can be implemented. The network interface device 110 can be attached to the telephone signal line 120 at virtually any point on the telephone signal line 120. thereby making it possible to implement various tests at multiple points in the telephone signal line 120.

Since the signal switches 440, 450, 460, 470, 480 operate independently, one or more can be implemented simultaneously. The signal switches 440, 450, 460, 470, 480 are activated by the relays 430 and controlled by the micro-controller 420. An external source, such as the central switching office 210 or a computer system 320, can control the signal switches 440, 450, 460, 470, 480 through the input/output interface 410 and the micro-controller 420. Due to the arrangement of the signal switches 440, 450, 460, 470, 480, and remote controllability of the signal switches 440, 450, 460, 470, 480 through the on-board micro-controller 420, the network interface device 110 can be used as a stand-alone device that is completely portable. In one embodiment, the network interface device 110 can be installed in multiple signal destinations 220, 230, 240. The installation of the network interface device 110 in remote locations allows the central switching office 210 to have the capability to thoroughly test, qualify, and troubleshoot telephone signal lines 120 without significant manual efforts. The present invention provides a device for automated testing and evaluation of telecommunication infrastructure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for testing and evaluating a transmission line, comprising a network interface device capable of implementing one or more tests on said transmission line, said network interface device comprising a controller capable of causing said network interface device to enter at least one of a normal mode for allowing normal operation of said transmission line wherein normal operation of said transmission line is not altered, and an active mode for modifying an operation of said transmission line, wherein modifying an operation of said transmission line comprises imiplementing an open circuit upon said transmission line, inverting said transmission line, shorting said transmission line, implementing an active impedance upon said transmission line, and implementing a resistive load upon said transmission line.

2. The apparatus of claim 1, wherein said network interface device is capable of testing and evaluating said transmission line, wherein said transmission line is a communication line for a network.

3. The apparatus of claim 2, wherein said network is a computer network.

4. The apparatus of claim 3, wherein said computer network is a home network capable of electronically linking a plurality of electronic devices.

5. The apparatus described in claim 1, wherein said network interface device further comprises:
   an input/output interface capable of receiving data and command signals;
   said controller being electrically coupled to said input/output interface, said controller being adapted to receive and process said data and command signals from said input/output interface;
   at least one signal switch electrically coupled to said transmission line; and
   at least one relay electrically coupled to said controller, said relay being adapted to activate said at least one signal switch in response to a set of commands from said controller.

6. The apparatus described in claim 5, wherein said input/output interface further comprises:
   a slow command channel for receiving command signals; and
   a modem-type channel for receiving data signals.

7. The apparatus described in claim 5, wherein said signal switch further comprises:
   at least one short circuit switch electrically coupled to said relay and said transmission line, said short circuit switch adapted to be activated by said relay;
   at least one open circuit switch electrically coupled to said relay and said transmission line, said open circuit switch adapted to be activated by said relay;
   at least one wire inversion switch electrically coupled to said relay and said transmission line, said at least one wire inversion switch adapted to be activated by said relay;
   at least one active impedance termination switch electrically coupled to said relay and said transmission line, said active impedance termination switch adapted to be activated by said relay; and
   at least one resistive load termination switch electrically coupled to said relay and said transmission line, said resistive load termination switch adapted to be activated by said relay.

8. The apparatus described in claim 5, wherein said relay is an electromechanical device capable of activating said signal switch.

9. The apparatus described in claim 7, wherein said short circuit switch is capable of:
   entering a normal operation mode, wherein said transmission line is not altered; and
   entering an active mode, wherein said short circuit switch is capable of shorting a signal wire and a ground wire of said transmission line.

10. The apparatus described in claim 7, wherein said open circuit switch is capable of:
    entering a normal operation mode, wherein said transmission line is not altered; and
    entering an active mode, wherein said open circuit switch is capable of creating an open circuit on a signal wire and a ground wire of said transmission line.

11. The apparatus described in claim 7, wherein said wire inversion switch is capable of:
    entering a normal operation mode, wherein said transmission line is not altered; and
    entering an active mode, wherein said wire inversion switch is capable of inverting a signal wire and a ground wire of said transmission line.

12. The apparatus described in claim 7, wherein said active impedance termination switch is capable of:

entering a normal operation mode, wherein said transmission line is not altered; and entering an active mode, wherein said active impedance termination switch is capable of terminating a signal wire and a ground wire of said transmission line with an active impedance load.

13. The apparatus described in claim 12, wherein said active impedance load is primarily a reactive load.

14. The apparatus described in claim 7, wherein said resistive load termination switch is capable of:

entering a normal operation mode, wherein said transmission line is not altered; and entering an active mode, wherein said resistive load termination switch is capable of terminating a signal wire and a ground wire of said transmission line with a predetermined resistive load value.

15. The apparatus described in claim 1, wherein said network interface device is coupled to said transmission line, said transmission line being coupled to a central switching office and being capable of transmitting commands and data to said network interface device.

16. The apparatus described in claim 15, wherein said transmission line is a telephone local loop.

17. The apparatus described in claim 16, wherein said transmission line is a network.

18. The apparatus described in claim 17, wherein said network is a computer network.

19. The apparatus described in claim 18, wherein said computer network is a home network.

20. The apparatus described in claim 1, wherein said network interface device is coupled to a computer interface that is electrically connected to a computer system, said computer system being capable of transmitting commands and data to said network interface device.

21. A method for testing and evaluating a transmission line, comprising:

receiving a set of command signals through an input/output interface;

processing said command signals from said input/output interface for controlling at least one relay;

activating at least one switch for conditioning said transmission line using said relay, conditioning said transmission line comprises performing at least one of testing said transmission line and modifying an operation of said transmission line; and conditioning said transmission line based upon said activated switch, wherein conditioning said transmission line comprises at least one of providing an open circuit upon said transmission line, inverting said transmission line, shorting said transmission line, providing a active impedance upon said transmission line, and providing a resistive load upon said transmission line.

22. The method as described in claim 21, wherein processing said command signals further comprises processing said command and data signals using a controller.

23. The method as described in claim 22, wherein processing said command signals using a controller further comprises said controller driving said relay.

24. The method as described in claim 21, wherein conditioning said transmission line further comprises activating at least one short circuit switch for short circuiting said transmission line.

25. The method as described in claim 21, wherein conditioning said transmission line further comprises activating at least one open circuit switch for performing an open circuit test on said transmission line.

26. The method as described in claim 21, wherein conditioning said transmission line further comprises activating at least one line inversion switch for performing a wire inversion of said transmission line.

27. The method as described in claim 21, wherein conditioning said transmission line further comprises activating at least one active impedance termination circuit switch for introducing an active impedance load on said transmission line.

28. The method as described in claim 27, wherein introducing said active impedance load further comprises introducing said active impedance load that is primarily a reactive load.

29. The method as described in claim 21, wherein conditioning said transmission line further comprises activating at least one resistive load termination circuit switch for introducing a resistive load on said transmission line.

30. An apparatus for testing and evaluating a transmission line, comprising:

means for receiving a set of command signals through an input/output interface;

means for processing said command signals from said input/output interface for controlling a set of relays;

means for activating one or more switches for conditioning said transmission line using said relays, conditioning said transmission line comprises performing at least one of testing said transmission line and modifying an operation of said transmission line; and means for conditioning said transmission line based upon said activated switches, wherein means for conditioning said transmission line comprises at least one of means for providing an open circuit upon said transmission line, means for inverting said transmission line, means for shorting said transmission line, means for providing a active impedance upon said transmission line, and means for providing a resistive load upon said transmission line.

* * * * *